(12) United States Patent
Berger et al.

(10) Patent No.: US 6,619,227 B1
(45) Date of Patent: Sep. 16, 2003

(54) MILKING EQUIPMENT WASH MONITORING SYSTEM AND METHOD

(75) Inventors: Dennis Berger, Wilmington, NC (US); John F. Grau, Little Falls, NY (US); Dominick A. Caracas, New Hartford, NY (US)

(73) Assignee: Danaher Controls, Elizabethtown, NC (US)

( * ) Notice: Subject to any disclaimer, the term of this patent is extended or adjusted under 35 U.S.C. 154(b) by 0 days.

(21) Appl. No.: 10/115,674

(22) Filed: Apr. 4, 2002

(51) Int. Cl.$^7$ ................................................ A01J 7/02
(52) U.S. Cl. ................................. 119/14.08; 119/14.18
(58) Field of Search ..................... 119/14.01, 14.08, 119/14.14, 14.18

(56) References Cited

U.S. PATENT DOCUMENTS

| | | |
|---|---|---|
| 3,618,621 A | 11/1971 | Nordegren |
| 3,726,253 A * | 4/1973 | Duncan .................. 119/14.18 |
| 3,916,923 A | 11/1975 | Branton |
| 4,015,618 A | 4/1977 | Schmid |
| 4,061,504 A | 12/1977 | Zall et al. |
| 4,175,514 A | 11/1979 | Souza et al. |
| 4,222,346 A * | 9/1980 | Reisgies .................. 119/14.18 |
| 4,530,370 A | 7/1985 | Horky |
| 4,572,105 A | 2/1986 | Chowdhury et al. |
| 4,710,755 A | 12/1987 | Gurney |
| 5,167,201 A | 12/1992 | Peles |
| 5,272,997 A | 12/1993 | van der Lely et al. |
| 5,390,627 A * | 2/1995 | van der Berg et al. ... 119/14.08 |
| 5,762,020 A | 6/1998 | van der Lely |
| 5,769,025 A * | 6/1998 | van der Lely et al. .... 119/14.42 |
| 5,842,436 A | 12/1998 | van der Lely |
| 5,881,669 A | 3/1999 | van den Berg et al. |
| 5,896,828 A | 4/1999 | Kronschnabel et al. |
| 5,957,081 A | 9/1999 | van der Lely et al. |
| RE36,391 E | 11/1999 | van den Berg et al. |
| 5,996,529 A | 12/1999 | Sissom et al. |
| 6,079,359 A | 6/2000 | van den Berg |
| 6,089,242 A | 7/2000 | Buck |
| 6,102,052 A | 8/2000 | Versteijnen |
| 6,267,077 B1 | 7/2001 | van den Berg et al. |

* cited by examiner

*Primary Examiner*—Robert P. Swiatek
(74) *Attorney, Agent, or Firm*—Hoffman, Warnick & D'Alessandro LLC; Spencer K. Warnick

(57) ABSTRACT

A milking equipment wash monitoring system and method that determine whether a wash cycle, in which washing occurs with a wash solution temperature above a set point for a preset wash duration, occurs within a wash-required timeframe. An indicator is provided to indicate whether the wash cycle has occurred within the wash-required timeframe. The system and method provide a mechanism by which adequate cleansing of milking equipment can be achieved on a regular basis.

12 Claims, 3 Drawing Sheets

MILKING EQUIPMENT WASH MONITORING SYSTEM AND METHOD

BACKGROUND OF THE INVENTION

1. Technical Field

The present invention relates generally to milking equipment and, more particularly, to a milking equipment wash monitoring system and method.

2. Related Art

The safety of raw food products and, in particular, milk produced by dairy farms is important to reduce the risk of food related disease. In some countries, milk that does not meet standards for low bacteria count can be refused pickup. As a result, the dairy farmer must dump, i.e., throw out, his/her milk, which is very expensive.

One mechanism to reduce bacteria in milk is to wash the milking equipment frequently. For example, many countries require milking equipment to be washed after every milking to reduce the amount of bacteria in milk produced by the equipment. A variety of washing systems for milking equipment exist, but pose a number of unsolved problems. One problem is that the cleanliness of the milking equipment can only be insured when specified wash parameters are met. One parameter is that wash solution temperature must remain above a set point in order to eradicate bacteria. A second parameter is that the wash must occur for a minimum duration at the preset wash solution temperature. A third parameter is that the duration between washes cannot exceed a specified wash-required timeframe. Meeting each one of these parameters is very challenging for a dairy farmer that has a variety of other tasks to achieve, e.g., tending to care and actual milking of the herd.

A variety of milking equipment wash monitoring systems exist to aid the dairy farmer. One exemplary system is disclosed in U.S. Pat. No. 6,089,242 to Buck. Buck discloses a data processor programmed to compare a thermocouple signal to an acceptable predetermined temperature range and generate a warning signal when the wash water temperature is outside of the acceptable predetermined temperature range. However, Buck fails to provide a system that assures that washes are conducted at appropriate intervals. A second exemplary system is disclosed in U.S. Pat. No. 6,079,359 to van den Berg. Similar to Buck, this reference monitors wash temperature, but not the duration between washes.

U.S. Pat. No. 5,967,081 to van der Lely et al. discloses an automatic milking and milk cooling apparatus that provides automatic cleaning at preset intervals. See col. 17, lines 13–15. However, the system does not insure that the cleaning is provided at sufficient temperatures. Hence, there is no assurance that the milking equipment is sufficiently cleansed in this system.

In view of the foregoing, there is a need in the art for a milking equipment wash monitoring system that assures adequate milking equipment cleansing on a regular basis.

SUMMARY OF THE INVENTION

In a first aspect of the invention is provided a milking equipment wash monitoring system comprising: a wash solution temperature sensor; a wash duration timer that times a wash duration of the milking equipment; a wash-required timer that times a wash-required timeframe; a data processor for receiving inputs from the wash solution temperature sensor, the wash duration timer and the wash required timer for determining whether a wash cycle, in which washing occurs with a wash solution temperature above a set point for a preset wash duration, occurs within the wash-required timeframe; and an indicator to indicate whether the wash cycle has occurred within the wash-required timeframe.

A second aspect of the invention is directed to a method of monitoring washing of milking equipment, the method comprising the steps of: determining whether a wash cycle, in which washing occurs with a wash solution temperature above a set point for a preset wash duration, has occurred within a wash-required timeframe; and indicating whether the wash cycle has occurred within the wash-required timeframe.

A third aspect of the invention is directed to a computer program product comprising a computer useable medium having computer readable program code embodied therein for reporting on performance of a plurality of parameters, the program product comprising: program code configured to determine whether a wash cycle, in which washing occurs with a wash solution temperature above a set point for a preset wash duration, has occurred within a wash-required timeframe.

A fourth aspect of the invention provides a milking equipment wash monitoring system comprising: an activation sensor that indicates when the milking equipment is ready for washing; a wash solution temperature sensor; a wash duration timer for timing washing of the milking equipment; a wash-required timer for timing a duration between wash cycles; a data processor for receiving inputs from the activation sensor, the wash solution temperature sensor, the wash duration timer and the wash required timer for determining whether a wash cycle, in which washing occurs with a wash solution temperature above a set point for a preset wash duration, occurs within a wash-required timeframe; an indicator to indicate whether the wash cycle has occurred within the wash-required timeframe; and a reset for resetting the monitoring system when the wash cycle has not occurred within the wash-required timeframe.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
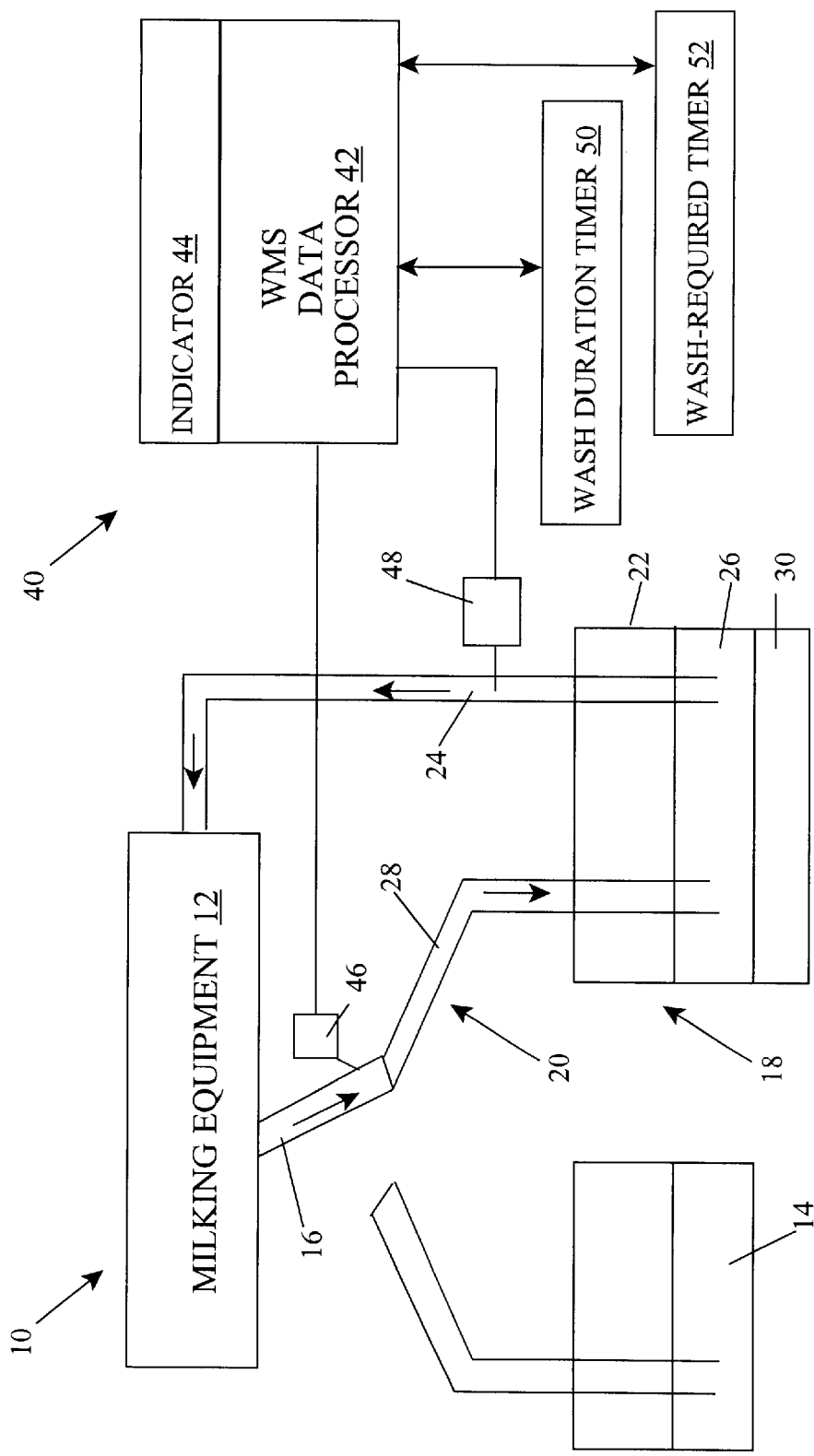
FIG. 1 shows a schematic diagram of milking equipment and a wash monitoring system.

With reference to the accompanying drawings, FIG. 1 illustrates a schematic of a milk producing dairy 10. Dairy 10 generally includes milking equipment 12 as known to those skilled in the art for milking a herd (not shown) of animals, e.g., cows. In one embodiment, milking equipment 12 is in-place milking equipment that may include, for example, a number of milking stations, pump, filter, controller, cooler, and a variety of piping components, e.g., pipes, valving, etc. Milking equipment 12 may be coupled to a bulk milk tank 14 during operation via a moveable pipe system 16. During milking operation, milking equipment 12 collects milk from the herd and delivers it to bulk milk tank 14 for storage.

Periodically milking equipment 12 must be washed. As shown in FIG. 1, in this setting, movable pipe system 16 is located to couple to a wash system 18. Wash system 18 may include a pipe system 20 coupled to a wash solution tank 22. Pipe system 20 may include an output line 24 that delivers wash solution 26 to milking equipment 12 and a return line 28 for returning wash solution to wash solution tank 22. Wash solution 26 may be any fluid now known or later developed for washing piping systems. In one embodiment, wash solution 26 may be a solution of water and detergent. Wash solution 26 may be heated in solution tank 22 via a heating element 30. Alternatively, wash solution 26 may be piped to a separate heating mechanism (not shown). Wash solution 26 may be pumped through milking equipment 12 by a pump that is part of milking equipment 12 or may be pumped by a separate pump (not shown).

A wash monitoring system 40 is provided to assure adequate cleansing of milking equipment 12 on a regular basis. Wash monitoring system 40 may include a wash monitoring system (WMS) data processor 42, an indicator 44, an activation sensor 46, a wash solution temperature sensor 48, a wash duration timer 50 and a wash-required timer 52. Wash duration timer 50 times a wash duration of the milking equipment, and wash-required timer 52 times a timeframe in which a wash cycle of milking equipment 12 must be completed, i.e., a "wash-required timeframe." A "wash cycle," as used herein means washing occurs with a wash solution temperature above a set point for a preset wash duration.

Figure 2:
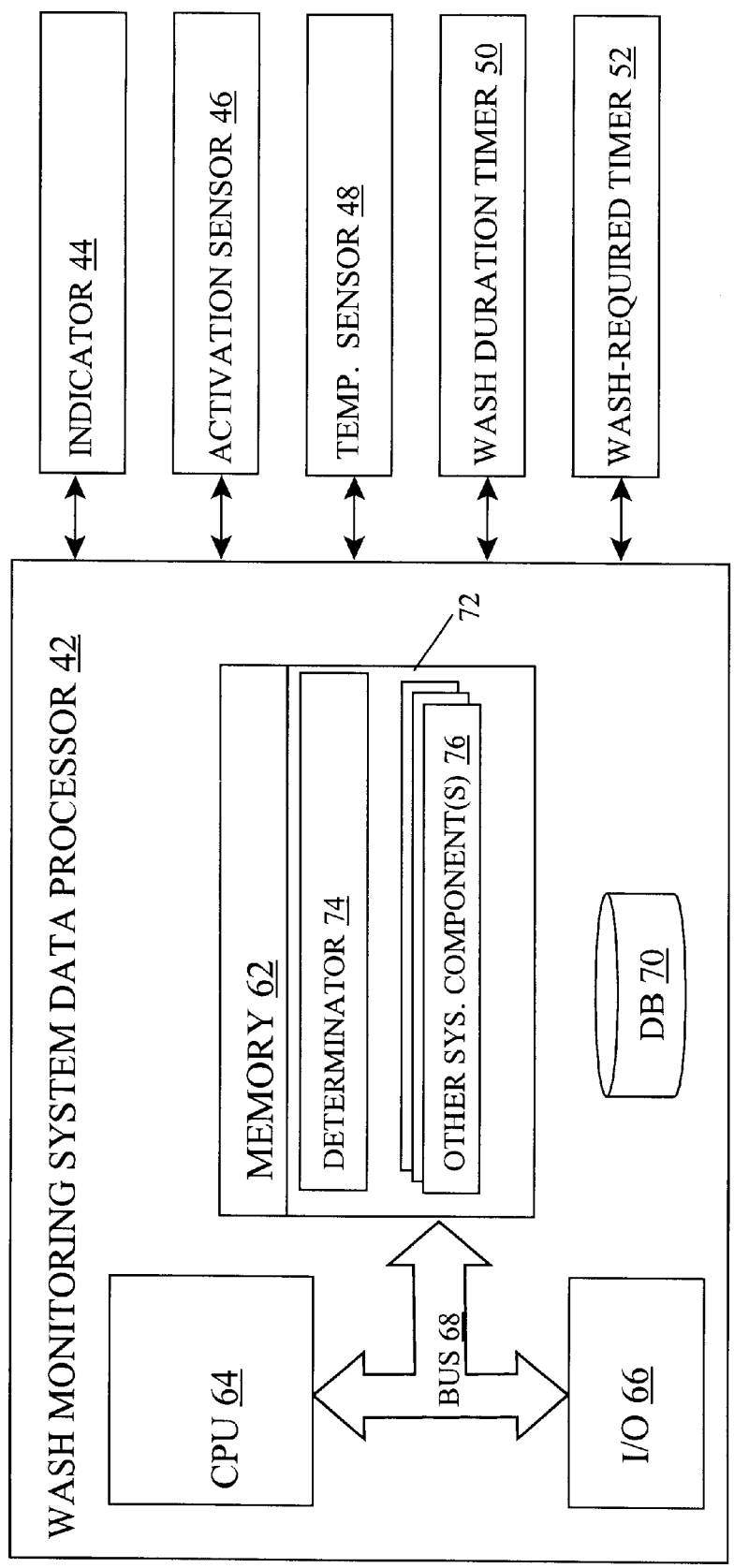
FIG. 2 shows a block diagram of the wash monitoring system.

With reference to FIG. 2, a block diagram of wash monitoring system 40 is shown. Data processor 42 may include a memory 62, a central processing unit (CPU) 64, input/output devices (I/O) 66 and a bus 68. A database 70 may also be provided for storage of data relative to processing tasks. Memory 62 includes a program product 72 that, when executed by CPU 64, comprises various functional capabilities described in further detail below. Memory 62 (and database 70) may comprise any known type of data storage system and/or transmission media, including magnetic media, optical media, random access memory (RAM), read only memory (ROM), a data object, etc. Moreover, memory 62 (and database 70) may reside at a single physical location comprising one or more types of data storage, or be distributed across a plurality of physical systems. CPU 64 may likewise comprise a single processing unit, or a plurality of processing units distributed across one or more locations. In one embodiment, CPU 64 utilizes standard operating system software, which is designed to drive the operation of the particular hardware and which is compatible with other system components and I/O controllers. I/O 66 may comprise any known type of input/output device including a network system, modem, keyboard, mouse, scanner, voice recognition system, CRT, printer, circle recorder, disc drives, etc. Additional components, such as cache memory, communication systems, system software, etc., may also be incorporated into system 40.

As shown in FIG. 2, program product 72 may include a determinator 74 and other system components 76. Determinator 74 is configured to determine whether a wash cycle has occurred within the wash-required timeframe. Other system components 76 may include any now known or later developed systems for monitoring other milking procedures. For example, other system components 76 may include a milking control system, a milk tank temperature control, etc.

Figure 3:
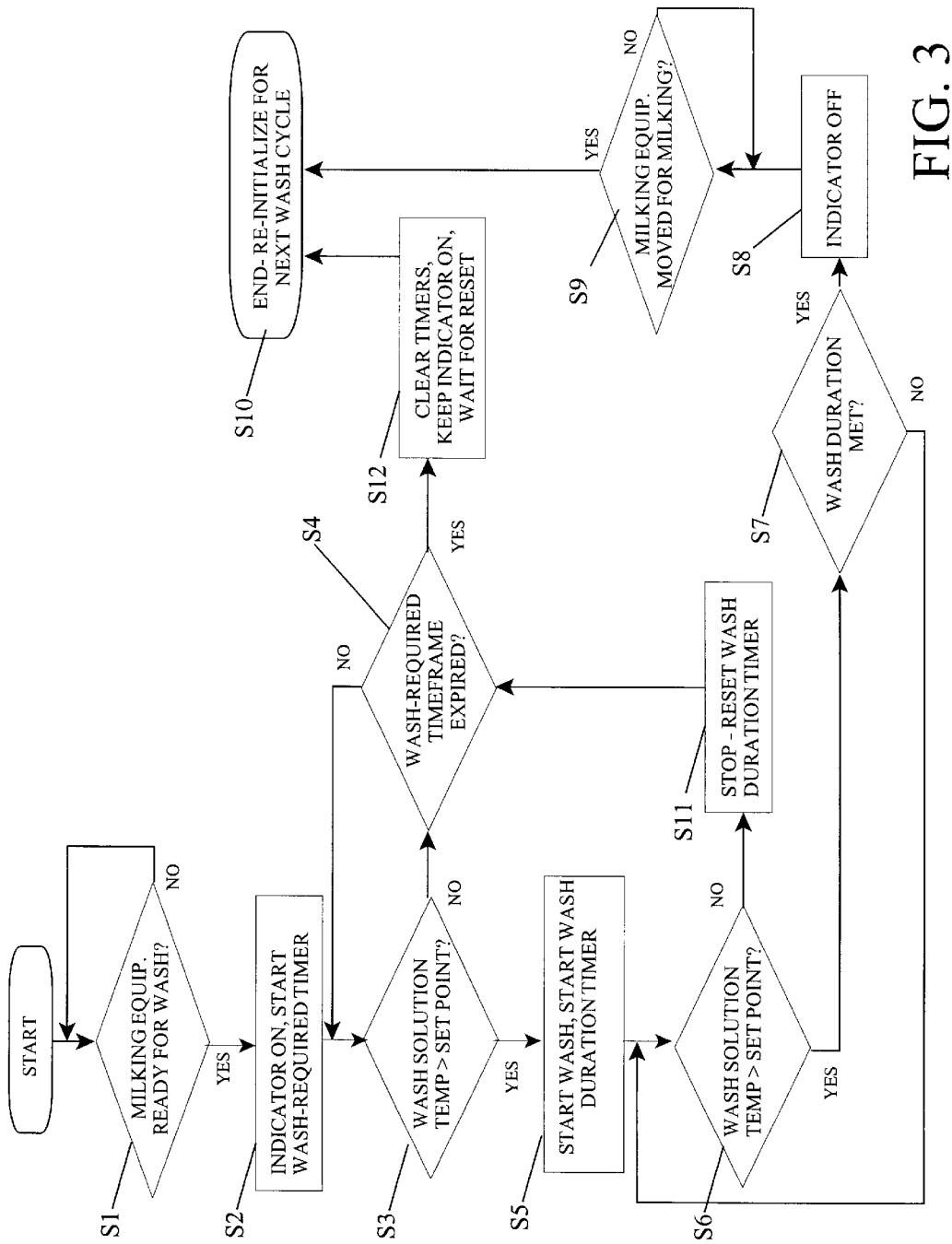
FIG. 3 shows an operation flow diagram of the wash monitoring system.

Operation of wash monitoring system 40 and, in particular, determinator 74, will be described relative to the flow diagram of FIG. 3. In a first step S1, a determination whether milking equipment 12 is ready for washing is made. In one embodiment, this determination can be made by moveable pipe 16 being placed in position to activate activation sensor 46, as shown in FIG. 1. Activation sensor 46 may be, for example, a switch or other mechanism capable of sensing the presence of movable pipe 16 in a particular position. Other mechanisms for determining that milking equipment 12 is ready for washing are also possible and within the skill of those in the art.

In step S2, indicator 44 is turned on, i.e., an indication is made. Indicator 44 may be a light, a noise maker or any other mechanism capable of indicating a status of wash system 20. Step S2 also includes starting wash-required timer 52 to track the time between wash cycles.

In step S3, wash solution temperature is compared to a set point temperature. In one embodiment, the wash solution temperature must exceed 45° C. However, other temperatures are also possible. If the wash solution temperature does not exceed the set point, a determination as to whether the wash-required timeframe has expired is made, step S4, by accessing wash-required timer 52. Wash-required timeframe may be set to any amount of time desired. In one example, washing is required twice a day and, accordingly, wash-required timeframe is set to 12 hours. If the wash-required timeframe has not expired, system 40 cycles back to step S3 to wait for the wash solution temperature to exceed the set point.

Once the wash solution temperature exceeds the set point, a "wash" is considered begun and the wash duration timer 50 is started to track the amount of time that milking equipment 12 is being washed with wash solution 26 above the set point. The actual movement of wash solution 26 through piping systems 24, 28 and milking equipment 12 may occur during the heating of wash solution 26 or the movement may wait for wash solution 26 to exceed the set point.

At step S6, a determination is made whether wash solution temperature remains above the set point. The temperature of wash solution 26 may drop for a number of reasons. For instance, many dairy barns are not heated and, accordingly, wash solution temperature can drop as it cycles through milking equipment 12 and pipe systems 24, 28. In another example, heating element 30 may not be able to keep up with the demand for hot wash solution.

If wash solution temperature remains above the set point, system 40 proceeds, step S7, to determine whether a wash duration has been met as tracked by wash duration timer 50. The wash duration can be any desired amount of time thought to be satisfactory for cleaning milking equipment 12. In one example, a half hour wash duration may be sufficient to clean equipment 12. If the wash duration has not been met, then system 40 cycles between steps S6 and S7. Once the wash duration has been met, system 40 proceeds, step S8, to turn indicator 44 off, i.e., remove the indication, to indicate to the user that a successful wash cycle has completed. In step S9, system 40 waits for milking equipment 12 to be used for milking again. In one embodiment, this determination is made by movable pipe 16 being moved to a milking position, i.e., coupled to bulk milk tank 14. Other mechanisms are also possible for making this determination. Once milking equipment 12 is used for milking again, step S10, system 40 is re-initialized for the next wash cycle.

Returning to step S6, during washing, if the wash solution temperature drops below the set point, system 40 stops and resets wash duration timer 50, step S11. Since a successful wash cycle was not completed for the requisite duration, indicator 44 remains on, i.e., indicating a wash is required. System 40 then returns to step S4 where a determination as to whether wash-required timeframe has expired is made by accessing wash-required timer 52. If the wash-required timeframe has not expired, system 40 again cycles back to step S3 to wait for the wash solution temperature to exceed the set point.

If the wash-required time frame has expired, system 40 proceeds, step S12, to reset wash duration timer 50 and wash-required timer 52 and wait for a user to manually reset the system. In this case, indicator 44 remains on to indicate a successful wash cycle has not occurred. Reset can be provided in any manner now known or later developed. In one embodiment, a user must press a reset key of system 40. Once the system is reset, system 40 is re-initialized for the next wash cycle.

The above processing provides a method of monitoring washing of milking equipment by determining whether a wash cycle, in which washing occurs with a wash solution temperature above a set point for a preset wash duration, has occurred within a wash-required timeframe; and indicating whether the wash cycle has occurred within the wash-required timeframe. The determining step may include: a) monitoring the wash-required timeframe using wash-required timer 50; b) monitoring wash solution temperature with a wash solution temperature sensor 48; c) evaluating whether the wash solution temperature remains above a set point during washing for the preset wash duration as timed by wash duration timer 50; and e) resetting wash duration timer 50 when the wash solution temperature drops below the set point during washing, and repeating the evaluating step when the wash-required timeframe has not expired. The method also may include the step of determining when milking equipment 12 is ready for washing prior to determining whether a wash cycle is achieved.

It should be recognized that while the particular processing for system 40 has been described, any processing capable of providing the claimed method is considered within the scope of the invention.

In the previous discussion, it will be understood that the method steps discussed are performed by a processor, such as CPU 64 of system 40, executing instructions of program product 72 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A milking equipment wash monitoring system comprising:
   a wash solution temperature sensor;
   a wash duration timer that times a wash duration of the milking equipment;
   a wash-required timer that times a wash-required timeframe;
   a data processor for receiving inputs from the wash solution temperature sensor, the wash duration timer and the wash required timer for determining whether a wash cycle, in which washing occurs with a wash solution temperature above a set point for a preset wash duration, occurs within the wash-required timeframe; and
   an indicator to indicate whether the wash cycle has occurred within the wash-required timeframe.

2. The system of claim 1, further comprising an activation sensor that indicates when the milking equipment is ready for washing, wherein the data processor receives an input parameter from the activation sensor.

3. The system of claim 2, wherein the activation sensor is a switch.

4. The system of claim 1, wherein the milking equipment includes a piping system.

5. The system of claim 1, wherein the indicator is an alarm light.

6. The system of claim 1, further comprising a reset for resetting the monitoring system when the wash cycle has not occurred within the wash-required timeframe.

7. A method of monitoring washing of milking equipment, the method comprising the steps of:
   determining whether a wash cycle, in which washing occurs with a wash solution temperature above a set point for a preset wash duration, has occurred within a wash-required timeframe; and
   indicating whether the wash cycle has occurred within the wash-required timeframe.

8. The method of claim 7, further comprising the step of determining when the milking equipment is ready for washing prior to determining whether a wash cycle is achieved.

9. The method of claim 7, wherein the determining step includes:
   a) monitoring the wash-required timeframe using a wash-required timer;
   b) monitoring a wash solution temperature with a wash solution temperature sensor;
   c) evaluating whether the wash solution temperature remains above a set point during washing for the preset wash duration as timed by a wash duration timer;
   e) resetting the wash duration timer when the wash solution temperature drops below the set point during washing, and repeating the evaluating step when the wash-required timeframe has not expired.

10. A milking equipment wash monitoring system comprising:

an activation sensor that indicates when the milking equipment is ready for washing;

a wash solution temperature sensor;

a wash duration timer for timing washing of the milking equipment;

a wash-required timer for timing a duration between wash cycles;

a data processor for receiving inputs from the activation sensor, the wash solution temperature sensor, the wash duration timer and the wash required timer for determining whether a wash cycle, in which washing occurs with a wash solution temperature above a set point for a preset wash duration, occurs within a wash-required timeframe;

an indicator to indicate whether the wash cycle has occurred within the wash-required timeframe; and a reset for resetting the monitoring system when the wash cycle has not occurred within the wash-required timeframe.

11. The system of claim 10, wherein the activation sensor is a switch that is activated by locating part of the milking equipment in a wash position.

12. The system of claim 10, wherein the indicator is an alarm light that is off when washing is not required.

* * * * *